Dec. 12, 1939.   O. I. JUDELSHON   2,183,401
CLUTCH
Filed Nov. 30, 1936   2 Sheets-Sheet 1
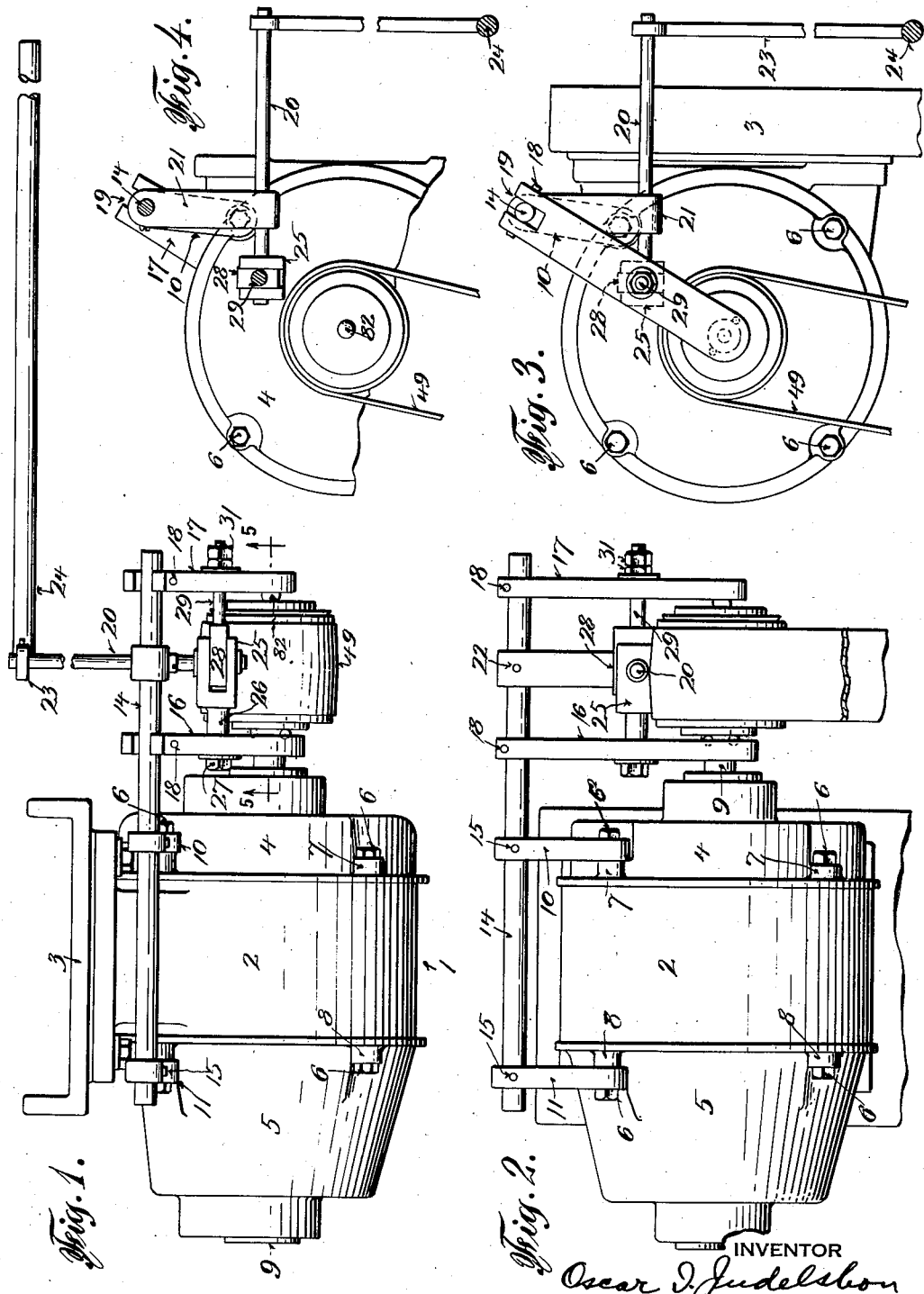
INVENTOR
Oscar I. Judelshon
BY
Charles G. Hensley
ATTORNEY

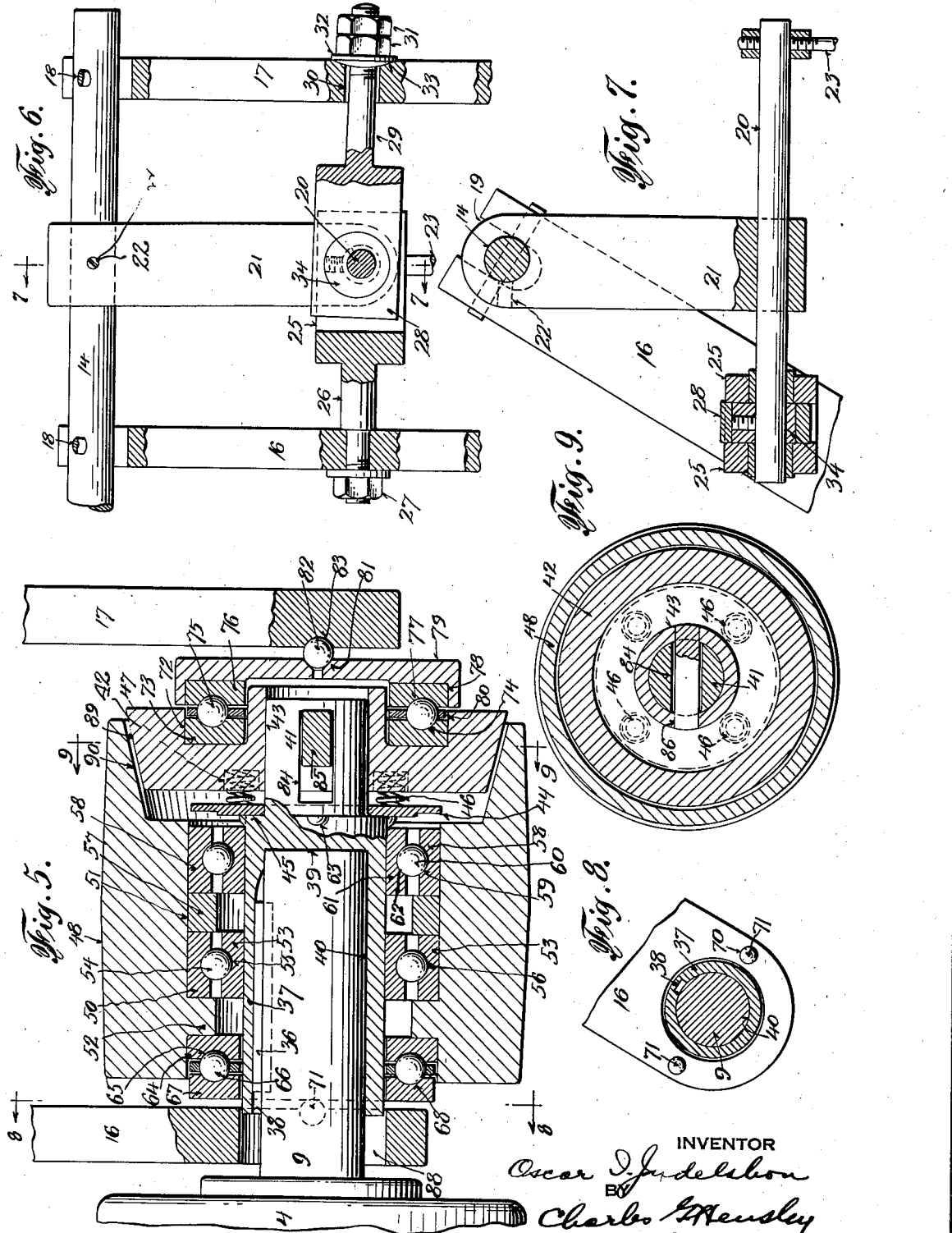

Patented Dec. 12, 1939

2,183,401

UNITED STATES PATENT OFFICE 2,183,401

CLUTCH

Oscar I. Judelshon, Park Ridge, N. J.

Application November 30, 1936, Serial No. 113,394

15 Claims. (Cl. 192—66)

My invention relates to clutches for causing the stopping and starting of a driven device in relation to a source of power. One object is to provide a clutch of very simple, inexpensive and compact form and one which may be engaged and disengaged by the exertion of the least possible energy.

Another object is to provide a clutch which will allow the source of power to operate with negligible resistance when the device is out of operation.

Another object is to provide a clutch which is noiseless in its operation.

Another object is to provide a clutch which, for any given duty, will be small and compact.

Notwithstanding all of the clutches which have been designed for throwing mechanical devices into and out of operation from a source of power, I have been unable to find any clutch on the market which can be used direct with a fast moving electric motor. The present clutch may be placed on the shaft of a motor running at comparatively ordinary or even high motor speed, for coupling and uncoupling a driven device. I know of no clutch on the market which can be applied to a shaft running over 600 revolutions per minute, although the present clutch may be applied to a shaft running 1700 revolutions per minute or more.

Another object of my invention is to provide a clutch which is very compact and which may be applied to the end of a motor shaft without having the shaft made especially long and without having to extend the shaft. The compactness of the present clutch and the character of the mounting permit the clutch to be applied to the comparatively short end of the shaft projecting in standard types of motors and for this reason the device is adapted for easy application to the great number of motors now in use.

Another object is to employ a clutch having thrust ball bearings for the different parts of the clutch as well as ball bearings between the clutch members so that the operation of the clutch will be smooth, noiseless, and without vibration. While the clutch is especially valuable as applied to motor shafts, it may be applied to any shaft on any type of machine or apparatus so that its application is universal.

In my co-pending application Serial No. 102,471, filed September 25, 1936, I showed and described a clutch adapted for the same general purposes as the present invention. The present invention differs from that of said application in that ball bearings may be used instead of roller bearings between the clutch members in the present case. Furthermore, with the present case it is unnecessary to shift the pulley member laterally to throw the clutch into and out of operation, and therefore the belt is not liable to be thrown out of alignment even to a slight extent.

The present device is also simpler than that of said application, less expensive to make, and the number of end thrust bearings is reduced to two. Other advantages will appear in the following detailed description of my invention.

Insofar as the mounting of the clutch upon a motor is concerned, I prefer to use the same mounting or supporting device as that shown in my co-pending application and this mounting is shown in the present drawings and described although the same is claimed in the said co-pending application.

In the drawings forming part of this application,

Figure 1 is a plan view of a motor with my improved clutch applied thereto,

Figure 2 is a front elevation of the same,

Figure 3 is an end elevation thereof with the operating rod shown in section,

Figure 4 is a sectional view showing some of the same parts which are shown in Figure 3, Figure 5 is a sectional view, on an enlarged scale, and taken on the line 5—5 of Figure 1, Figure 6 is a view with parts broken away and showing, partly in elevation, the device for throwing the clutch into and out of operation, Figure 7 is a sectional view taken on the line 7—7 of Figure 6, Figure 8 is a sectional view taken on the line 8—8 of Figure 5, and Figure 9 is a sectional view taken on the line 9—9 of Figure 5.

I will describe my invention applied to a motor shaft, but it is understood that it is subject to universal application. It will be understood that the motor may be mounted on an overhead support, a wall support, a base support or any part of a machine according to the desired location in relation to the machine or device to be driven. In the drawings I have shown a motor 1 having a motor frame 2 which is mounted on a channel beam 3 in customary manner, and while the mounting is shown as a wall mounting, it will be understood that the motor may be mounted in any desired position.

I have shown the armature of the motor enclosed by caps 4, 5 attached to the motor frame by means of bolts 6 which pass through the bosses 7, 8 of the caps and are threaded into the motor frame to rigidly support the caps at opposite ends of the motor frame. These features are of ordinary construction and it will be understood that the motor has a shaft 9 which extends beyond the cap 4 but this extended portion of the shaft is relatively short in most standard motors but notwithstanding this the present clutch is sufficiently compact to be applied to this extended portion of the motor shaft.

The means for mounting the clutch device upon the motor is as follows: There are two bracket arms 10 and 11 one of which is attached against the boss 8 of the cap 4 by means of the bolt 6 which ordinarily merely attaches the cap to the motor frame; but in some instances it may be necessary to supply a longer bolt of the same nature to accommodate the bracket 10 at the end of the boss 7. The bracket arm 10 has an aperture to receive this bolt. The other bracket arm 11 has an aperture to receive the bolt 6 which may be one of the bolts supplied with the motor or in some cases it may be necessary to supply a longer bolt to accommodate the bracket. The bolt 6 passes through the boss 8 of the cap 5 and enters the motor frame 2.

As these bracket arms may be applied to any of the bosses 7 or 8 and as there are usually four each of such bosses on the caps of the motor frame, it will be obvious that these brackets may be applied to the motor frame in any one of four positions around the axis of the motor, according to whether the motor is mounted on an overhead support, a lower support, or a base support. These bracket arms require no change in the construction of the motor frame so that they are adapted to be applied to various types of motors.

There is a shaft 14 which is mounted in the free ends of the bracket arms 10, 11 where they are secured by the set screws 15 and it is obvious that the bracket arms may be spaced different distances apart on the shaft, according to the length of the motor frame, so that the parts may be mounted on various types of motors. In other words, it is not necessary to alter the construction of the motor to make my invention applicable thereto.

The shaft 14 extends on the right beyond the end of the cap 4 in Figures 1 and 2 and on this extended portion there are attached two supporting arms 16, 17 which are connected to the shaft by pins 18 which pass through the shaft 14 and which permit the arms 16, 17 to swing slightly in a plane containing the shaft axis. The shaft seats in the open sockets 19 on the ends of these arms so that the crotch thus formed guides the arms on the shaft. These arms are adapted to be drawn toward each other for tightening the clutch to throw the machine into operation by the motor and to be moved apart to release the clutch and thereby throw the machine out of operation. This is effected by an eccentric device as follows:

There is a short shaft 20 adapted to rock in an aperture in the end of the bracket 21 which is supported upon the shaft 14 and which is held thereon by a set screw 22. The shaft 20 is rocked through a crank lever 23 which itself may be operated by a longitudinal rod 24 which may run the whole length of the machine which is to be controlled by the clutch, so that the operator may throw the clutch into and out of operation from any point along the machine which is being operated by the motor.

The shaft 20 projects through a fork 25 arranged on one end of the rod 26 which is reduced in diameter and extends through the rocking arm 16 where it is clamped by the nut 27. The shaft also extends through the plate 28 which is carried by a rod 29, and this rod extends through an aperture 30 in the arm 17, the aperture being slightly larger than the rod to permit the latter to swivel in relation to the arm 17. The nuts 31 which are threaded onto the rod 29 press against the dished washer 32 which engages in a spherical recess 33 in the arm 17 to permit the arm 17 to swivel in relation to the rod 29. On the shaft 20 there is mounted an eccentric 34 which engages in an eccentric aperture in the plate 28.

When the shaft 20 is rocked manually by the operation of the rod 24 or the lever arm 23 in one direction of movement, the eccentric 34 causes the arm 17 to be swung so that the lower ends of the arms 16, 17 approach each other slightly and in the opposite direction of movement these two arms are caused to move apart slightly for a purpose which will be stated hereinafter.

The clutch device itself is constructed as follows: The portion of the motor shaft 9 projecting beyond the cap 4 is usually provided with a keyway having a key 36 therein. The clutch device includes a sleeve member 37 which fits over the extended end of the motor shaft and is provided with a key slot 38 to receive the key 36 on the motor shaft so that the sleeve is caused to revolve at all times with the motor shaft and permits one to have axial sliding movement relative to the other. Preferably, the end of the motor shaft normally touches the bottom surface 39 of the bore 40 of the sleeve. This bore will be of a size corresponding with the diameter of the particular motor shaft to which the clutch is to be applied and the sizes of the different motor shafts are standardized for motors of different horsepower.

The member of which the sleeve forms a portion has a stud shaft 41 projecting to the right in Figure 5 and on this is mounted the male clutch member 42 in such relation that the bore 43 of this clutch member fits the stud shaft 41 and it is movable axially thereon although the extent of this movement may be but a fraction of an inch. There is a collar 44 which fits over the stud shaft 41 and it seats against the shoulder 45 to form a bearing against which one end of each of the springs 46 seats, the other ends of the springs being received in recesses 47 extending inwardly from the left hand side of the male clutch member 42. It will be apparent that the male clutch member may be moved from right to left in Figure 5 a short distance against the opposition of the springs 46 and that the springs at all times tend to move the male member from left to right in Figure 5.

The female clutch member is shown as formed in the pulley member with which the driven belt engages. I have shown a pulley 48 having its belt engaging surface slightly crowned for well known reasons and while this pulley member is shown as adapted to co-operate with a flat type of belt 49 it will be obvious that the pulley member may be provided with a V shape groove like the pulley member in my said co-pending application for co-operation with a V type belt if that is desirable. In other words, either a flat belt or a V belt may be used insofar as the present invention is concerned.

The pulley member is mounted to revolve around the extended portion of the motor shaft as well as around the sleeve member 37 but it does not have to shift axially on either of these members for engagement and disengagement of the clutch since the axial movement in the present case is performed by the male clutch member independently of the sleeve member.

I have shown a plurality of sets of ball bearings interposed between the pulley member and the sleeve member as follows: The ring member 50 of the ball bearing device is fitted by a driving fit into the bore 51 of the pulley member so that one end of this ring seats against an inwardly directed flange 52 which is preferably formed integral with the pulley. The inner ring 53 which is generally of hardened steel, is concentric to the ring 50 and a ring of balls 54 is interposed between the two rings and they travel partly in a groove 56 in the ring 50 and partly in a groove 55 in the ring 53. Any desired type of cage for these balls may be used to keep them separated from each other in the raceway. The inner ring 53 of this ball bearing device is fitted by a tight fit over the periphery of the sleeve member 37 so that this ring at all times revolves with the motor shaft.

After this first ball bearing device has been inserted in position I force a separating ring 57 into the bore of the pulley member, preferably by a driving fit, to act as a separator between the first and second ball bearing devices. After the ring 57 has been placed as shown in Figure 5, the second ball bearing device is also driven or pressed into the bore of the pulley. This second ball bearing device consists of an outer, hardened ring 58 having a groove 59 for the balls 60, this ring fitting the bore of the pulley, and the second or inner ring 61 also has a groove 62 for the balls, and this ring fits snugly over the outer surface of the sleeve member. The pulley member thus remains stationary upon the sleeve and upon the motor shaft by reason of the ball bearing devices when the machine or apparatus is idle.

I prefer to provide small projections 63 adjacent the shoulder 45 on the sleeve member to prevent the ball bearing devices from moving endwise towards the right in Figure 5, so that the ball bearing devices will not move out against the ring 44.

I employ two ball thrust bearings through which opposing endwise pressures are applied to the clutch members; for instance, in the left portion of Figure 5 I have shown a ring member 64 of one ball end thrust device, which ring is fitted into the end of the bore 51 of the pulley member and seats against one side of the flange 52. This ring is provided with a groove 65 in which portions of the balls 66 travel. The outer ring 67 of this ball bearing device also has a groove 68 forming a raceway for a portion of the balls 66 and if desired a ball separator or cage may be used to keep the balls from coming into contact with each other.

There are two balls 71 disposed in a line at right angles to the direction of the arm 16, and these balls also project partly into spherically shaped recesses in the arm 16 corresponding to the construction in my said co-pending application. End thrust is applied through the end thrust bearing just described, by the arm 16 against the pulley, which also contains the female clutch member.

At the other end of the device shown in Figure 5, the male clutch member 42 is shown as provided with a recess or channel 72 extending inwardly from its right hand face and in this channel there is seated a ring 73 of a second ball end thrust bearing. This ring has a grooved raceway 74 for the bearing balls 75 to travel in and there is a second ring 76 forming part of this bearing device, which ring also has a raceway 77 in which the balls 75 travel. The ring 76 is seated in a recess or pocket 78 in a cap member 79 with which the ring remains in fixed relation. If desired, a cage or ball separator 80 may be used to prevent the bearing balls 75 from touching each other, which is a well known expediency in ball bearing devices.

The cap 79 at its center is provided with a spherical recess 81 in which the bearing ball 82 partly seats, and the arm 17 has a similar recess 83 in which the same ball partly seats, thereby providing contact between the arm 17 and the cap 79.

The stud shaft 41 carried by the sleeve member is provided with an elongated slot 84 extending therethrough, the slot being closed at both ends. The pin 85 shown as of elongated cross section, extends entirely through this slot 84 and projects at each end beyond the stud shaft 41 and these ends are received into apertures 86 in the hub portion of the male clutch member as shown more clearly in Figure 9. The pin 85 is preferably thinner than the width of the slot 84 in order that the pin may slide freely in the slot as the male clutch member is moved axially to engage and disengage with the female clutch member. This pin serves to lock the male clutch member to the stud shaft 41 so that the male clutch member will at all times revolve with the motor shaft.

*Operation*

To mount the clutch on a motor two of the bolts 6 are removed and then the apertured ends of the bracket arms 10, 11 are placed against the bosses 7, 8 from which the bolts have been removed; and they are adjusted so that their apertures register with the apertures in the bosses. The bolts 6 are then inserted through the apertures in the arms 10, 11 and are passed through the bosses and into the frame 2 and are tightened up to a limited extent only. If the shaft 14 is not inserted through the arms 10, 11 before the latter are mounted on the bosses 7, 8, it may be inserted through these arms afterwards. The bolts 15 will be left loose or nearly so, to permit the shaft 14 to turn in the bracket arms 10, 11. The arm 16 has an aperture 88 slightly larger than the sleeve 37 so that it can be passed over the end of the shaft 9 and the sleeve 37 to lie near to but out of contact with the cap 4 of the motor, and so that the arm 16 may swing slightly in relation to the shaft 9 and sleeve 37.

It will be apparent that the two arms 10, 11 may be spaced different distances apart along the shaft 14 to adapt the clutch for motor frames of different lengths. Furthermore, the radial distance from the axis of the motor shaft through the arc on which the bolts 6 coincide may be different in different motors, but the present mounting is adapted to be accommodated for different motors because the bracket arms 10, 11 are adapted to swing about the bolts 6, thereby accommodating themselves to the position of the shaft 14.

In other words, looking at the device as shown in Figure 3, the shorter the radial distance between the axis of the motor shaft and the bolts 6, the nearer the bracket arms 10, 11 will lie parallel to the arms 16, 17 and if the bolts 6 are of greater radial distance from the axis of the motor shaft, then the arms 10, 11 will be swung to an angle, or a more obtuse angle to the arms 16, 17 and in this manner the support is adjustable so that it may be applied to motors having different diameter frames. Each clutch is made for a given diameter of motor shaft.

The device is now set up for operation and the clutch members are normally held out of engagement by the springs 46 which force the male clutch member to the right in Figure 5. If the motor is set into operation the motor shaft will revolve and it will carry the male clutch member around with it by reason of the key 36 but there will be no appreciable load on the shaft 9 or friction because of the several ball bearing thrust members and because of the ball bearing devices between the sleeve 37 and the pulley. The motor may idle and the clutch will cause no noise whatsoever.

Whenever the machine or apparatus which is to be driven by the motor is to be set into operation, the operator will move the rod 24 or the lever arm 23 whichever is convenient, and this will rock the shaft 20. The rocking of the eccentric 34 which is on this shaft, will cause the free ends of the rocking arms 16, 17 to move toward each other a slight extent due to the eccentric motion and this movement, which need be only a fraction of an inch will throw the clutch into action and cause the motor to drive the machine or apparatus through the belt 49. The action in the clutch due to the swinging of the arms 16, 17 will be as follows:

The arm 16 at the left in Figure 5, will generally remain stationary and through the two balls 71 will apply end pressure against the ring 67 of the left hand thrust bearing and this will apply pressure from left to right against the female clutch member and pulley. At the other end of the clutch the following action takes place: The arm 17 swings from right to left and through the ball 82 applies pressure from right to left against the cup 79 and through this end thrust bearing pressure is applied against the male clutch member 42 tending to force the male clutch member from right to left against the opposition of the springs 46.

The male clutch member only has to move a fraction of an inch to bring the friction surfaces 89 and 90 into contact whereupon the clutch will be thrown in and the female clutch member, which includes or carries the pulley, will revolve with the male clutch member and with the motor shaft, thereby operating the belt 49 to drive the machine or apparatus to which the power is to be applied. Preferably, the parts are so designed that when the shaft 20 is rocked the eccentric 34 will be at dead center when the clutch members have been fully engaged, so that the clutch will remain in operation until the rod 24 or the lever arm 23 is moved in the opposite direction to that first described.

The present clutch is positive and reliable in its action because in the preferred form it employs frusto conical male and female clutch members and the usual pivoted arms are eliminated. As the frusto conical clutch portions are turned on a lathe they are accurate and perfectly parallel and are in frictional contact throughout when the clutch is in operation. Furthermore, the opposing pressures applied to the clutch members to throw them into engagement are applied through ball thrust bearings so that there is practically no friction as between the members applying the pressure and the clutch members.

The opposing pressures are so applied that the thrust bearings are not tilted or rocked and the fact that the arm 17 rocks in applying the pressures does not cause any rocking of the end thrust bearings. As the springs 46 which cause the opening of the clutch press on one end against the ring 44 and the male clutch member which are at all times revolving, their action causes no resistance to the revolving movement of the parts. The ball bearings interposed between the sleeve and the pulley prevent any appreciable friction between the clutch members while the clutch is open.

When the rod 24 or the lever arm 23 is swung in the opposite direction to that described above the eccentric will allow the arm 17 to be moved to the right and as soon as this occurs the springs 46 which are at all times exerting pressure on the male clutch member, will become effective and will move the male clutch member to the right or to the position shown in Figure 5 which immediately disengages the friction surfaces of the clutch members. The motor shaft then runs idle and while it carries the male clutch member with it the female clutch member remains idle. The clutch as a whole is made compact in the direction of its length, which allows it to be mounted on a relatively short motor shaft.

In motors having the sleeve type of bearing as distinguished from the ball bearing type, for the shaft, it is customary to allow the armature and its shaft to have a slight longitudinal movement for well known reasons. The present clutch does not prevent the slight longitudinal movement of the armature and its shaft because the two arms 16, 17 which apply opposing pressures to the clutch may swing on their pivotal supports 18 so that their lower ends may move slightly in the direction of the axis of the motor shaft and still maintain the opposing pressures on the clutch members to keep them engaged.

The opposing pressures for pressing the clutch members together are not applied in any manner to the shaft so that the means for applying the pressures is entirely independent of the shaft. This is true whether the clutch is applied to a motor shaft, a counter shaft or any other type of shaft, and it is an important factor in the succesful operation of the clutch. The opposing forces which force the clutch members together are applied directly to the clutch members. This allows the shaft to have the necessary slight longitudinal end thrust and it also avoids having the pressure applied to the shaft as in many previous constructions.

The opposing pressures are applied axially to the opposite clutch members notwithstanding the slight rocking movements of the arms 16, 17 because of the ball 82 and because of the balls 71. The pulley surrounds the sleeve 37 and the end of the motor shaft.

When the parts are in the conditon shown in Figure 5 the motor may be operating and if so its shaft will turn the sleeve member with it and the male clutch member will also revolve with the shaft, but the pulley will remain idle because the only connection at this time between the sleeve and the pulley will be through the ball bearing devices which will impart no movement to the pulley member. If it is desired to throw the clutch into operation, the rod 24 or the lever arm 23 will be moved in one direction and this will cause the two arms 16, 17 to move toward each other or, at least, it will cause one of these arms to move towards the other so that pressure will be applied to the left hand end of the device in Figure 5 against the ball bearing ring 67 and this pressure will be conveyed through the ball bearing device, to the shoulder 52 which is part of the pulley, but in the preferred construction there will be no actual movement of the pulley member but merely opposing pressure.

The arm 17 will be moved from right to left in Figure 5 during this operation and pressure will be applied through the ball 82 to the cap 79 and this pressure exerted from right to left in Figure 5 will be applied through the ball bearing device 74—76 to the male clutch member. This pressure will move the male clutch member from right to left in Figure 5 against the opposition of the springs 46 until the frusto conical surface 89 of the male clutch member comes into contact with the frusto conical surface 90 of the female clutch member and at first there may be a slippage between the clutch members until such time as the full pressure is applied by the arm 17 and after that the clutch members will be locked together. This will cause the pulley member to revolve with the motor shaft and the belt engaging the pulley will be driven to apply power to any machine or device which is being operated by the motor.

It will be noted that the opposing pressures applied to the clutch members to force the latter into locking engagement is not applied to the motor shaft but only to portions of the clutch device, and this in such manner that it will not interfere with the natural end thrust of the motor shaft. It will also be apparent that the male clutch member is the only part of the device which has to move axially to throw the clutch into and out of operation or, in other words, the pulley does not have to move axially and therefore the belt engaging the pulley does not move sidewise and therefore the belt is not thrown out of alignment. In other words, instead of moving the pulley axially as in my aforesaid co-pending application, only the male clutch member is moved axially.

The locking pin 85 which connects the male clutch member with the stud shaft 41 is permitted to slide in the aperture 84 so that the axial movement of the male clutch member is not imparted to this stud shaft or to the sleeve.

The present device enables me to use ball bearings between the pulley and the sleeve because there is no relative longitudinal movement between these members. However, if desired, roller bearings like those shown in the said copending application may be used in the present device in place of the two sets of ball bearings. However, there are certain advantages in the use of a double set of ball bearings and the latter are permissible as stated above. By making the clutch member movable in relation to the sleeve member I avoid having to have relative axial movement as between the pulley and the sleeve member.

The balls 71 through which pressure is applied to the left hand end thrust bearing in Figure 5 allows the arm 16 to apply this pressure without tilting the ball bearing ring 67 which is desirable because the arm 16 swings slightly on its pivot pin 18. The ball 82 also permits the arm 17 to apply end thrust pressure to the cap 79 without tilting the latter and both of these ball bearing pressure means permit opposing pressure to be applied to the clutch members in a manner which will avoid binding of the parts in relation to each other and in relation to the motor shaft.

In the present device I have reduced the number of ball end thrust bearing devices to two as distinguished from three such devices used in my said co-pending application, and I make it possible in the present case to use ball bearings in place of roller bearings if desired.

In addition, I have eliminated the necessity of having the pulley member move axially by separating the male clutch member from the sleeve. Furthermore, the overall length of the present clutch device is less than in the construction shown in my said co-pending application. Also, the present device does not project as far beyond the end of the motor shaft and the pulley may be closer to the motor housing than in my co-pending application.

The present device is very easy to assemble and it is inexpensive to manufacture.

Having described my invention, what I claim is:

1. A clutch device including a sleeve member adapted to be applied to a shaft to revolve therewith said sleeve being movable axially in relation to the shaft, a combined pulley and clutch member revolvable around said sleeve member, a second clutch member adapted to co-operate with said first clutch member, means for causing said second clutch member to revolve with said sleeve member and to permit it to move axially in relation thereto, and means engaged at the end of the clutch members operative for causing a relative axial movement of said clutch members to cause them to engage and disengage, said latter means operating to produce relative axial movement of said clutch members without applying axial pressure to said shaft.

2. A clutch device including a sleeve member adapted to be applied to a shaft and to revolve therewith, and one being axially movable relative to the other a clutch member rotatable on said sleeve member, a bearing device having rotatable bearing members interposed between said sleeve member and said clutch member, and a second clutch member adapted to co-operate with said first clutch member rotatable with said sleeve member and adapted to move axially in relation thereto, means yieldingly urging the clutch members to disengage the same and means at the end of the clutch members operative to axially move said clutch members to cause them to engage said latter means operating to produce relative axial movement of said clutch members without applying axial pressure to said shaft.

3. A clutch device including a sleeve member adapted to be applied to a shaft to revolve therewith, said sleeve member having a shoulder and having a shaft portion aligning with the shaft to which said sleeve is applied, a clutch member revolvable around said sleeve member, a second clutch member adapted to co-operate with said first clutch member and mounted on the shaft portion of said sleeve member to revolve with the latter and adapted to move axially thereon, a collar applied to the shaft portion of said sleeve member against said shoulder, springs interposed between said collar and said second clutch member, and means for applying opposing axial pressures to said clutch members to cause them to engage with each other.

4. A clutch device including a sleeve member adapted to be applied to a shaft to revolve therewith, a clutch member revolvable around said sleeve member, a second clutch member adapted to co-operate with said first clutch member, said second clutch member having means to cause it to revolve with said sleeve member and adapted to permit it to move axially in relation thereto, ball end thrust bearings for said clutch members and means for applying opposing axial pressures to said clutch members through said ball end thrust bearings said latter means operating to produce relative axial movement of said clutch members without applying axial pressure to said shaft.

5. A clutch device including a sleeve member adapted to be applied to a shaft to revolve therewith, a clutch member revolvable around said sleeve member, a bearing device having revolvable bearing members interposed between said sleeve member and said clutch member, a second clutch member adapted to co-operate with said first clutch member, said second clutch member mounted on said sleeve member and having means for causing it to revolve with the sleeve member and adapted to permit it to move axially in relation thereto, ball end thrust bearings for said clutch members and means for applying opposing axial pressures to said clutch members through said ball end thrust bearings said latter means operating to produce relative axial movement of said clutch members without applying axial pressure to said shaft.

6. A clutch device including a sleeve member adapted to be fitted over a shaft to revolve therewith, a pulley and clutch member mounted to revolve around said sleeve member, a bearing device having revolvable members interposed between the sleeve member and said pulley and clutch member, a second clutch member mounted on said sleeve member, means for causing the second clutch member to revolve with the sleeve member but permitting it to have axial movement in relation thereto, a ball end thrust member engaging said first clutch member, a ball end thrust member engaging said second clutch member, arms for applying opposing axial pressure to said ball end thrust bearings to move the clutch members into engagement, and balls interposed between said arms and said ball end thrust bearing devices.

7. In a clutch device, a drive shaft, a sleeve mounted on the shaft to rotate with and have axial movement on the shaft, a clutch member, a ball bearing device to rotatably support said clutch member on said sleeve, a second clutch member adapted to co-operate with the first clutch member loosely engaged on the sleeve, means to cause said second clutch member to rotate with and permit the same to move axially of the sleeve, means to yieldingly urge the second clutch member axially in one direction to disengage the clutch members, means including arms engaging at the ends of the clutch members to limit the disengaging movement of said second clutch member and operative to move said clutch member axially to engage the clutch members without applying axial pressure to the shaft and retain them in engagement and to release the clutch members to permit the one clutch member to be disengaged from the other clutch member by the yielding means.

8. In a clutch member, a drive shaft, a sleeve slidably engaged on the shaft and rotatable therewith, a clutch member, a plurality of parallel ball bearing devices interposed between said sleeve and clutch member rotatably mounting the clutch member on the sleeve, a second clutch member loosely engaged on the sleeve, means to connect said second clutch member to the sleeve to rotate therewith and permit said clutch member to move axially in relation to the sleeve into and out of engagement with the first clutch member, yielding means to axially move the second clutch member to disengage the same from the first clutch member, pivoted arms engaging at the ends of the clutch members to limit the disengaging movement thereof, and means operative to actuate said arms to axially move the second clutch member to engage the same with the first clutch member without exerting axial pressure on the shaft and lock said members in said position and actuate said arms to release the clutch members for actuation by the yielding means to disengage the same.

9. In a clutch device, a drive shaft, a sleeve slidably engaged on and rotatable with the shaft, a clutch member mounted on said sleeve to rotate thereon, a second clutch member loosely mounted on the sleeve adapted to co-operate with the first clutch member, means to cause said second clutch member to rotate with and permit it to have movement axially of the sleeve, spring means acting on said second clutch member to move it to disengaging position, and means to limit the disengaging movement of the clutch members and operative to axially move the second clutch member to engage said clutch member therewith and retain it in engagement with the first clutch member without applying axial pressure to the shaft.

10. In a clutch device, a drive shaft, a sleeve slidably engaged on the shaft and rotatable therewith, and said sleeve having a portion arranged co-axially of the shaft, a clutch member rotatable on said sleeve, a second clutch member loosely mounted on the portion of the sleeve arranged axially of the shaft, means to cause said second clutch member to rotate with the sleeve and permit it to move axially of the sleeve, means to exert a yielding force between the sleeve and said second clutch member to disengage the clutch members without exerting axial pressure on the shaft, and means for limiting the disengaging movement of said clutch members and operative to exert an axial force on the clutch members without exerting axial pressure on the shaft to engage and lock them in engaging position and to release the clutch members to be actuated to disengaging position by the yielding means.

11. In a clutch device, a drive shaft, a sleeve mounted on the shaft to rotate therewith and permit of axial movement of one relative to the other and said sleeve arranged with a portion coaxially of the shaft having an elongated slot diametrically therethrough, a pulley arranged as a clutch member rotatable on said sleeve, a clutch member loosely mounted on the portion of the sleeve coaxially of the shaft, a pin extending through the portion of the sleeve coaxially of the shaft and engaging said second clutch member to cause the latter to rotate with the sleeve and permit it to have movement axially of the sleeve, means to apply a yielding axial pressure to disengage the clutch members, means operative for applying axial pressure to the pulley and clutch member opposed to said yielding pressure to engage the clutch members and release said pressure from and permit the clutch members to be disengaged under the influence of the yielding pressure.

12. In a clutch device, a drive shaft, a sleeve mounted on the shaft to rotate therewith and permit axial movement of one relative to the other and said sleeve member having a shoulder and a portion at one end arranged coaxially of the shaft, a pulley arranged at one end as a clutch member rotatable on the sleeve, a clutch member adapted to co-operate with the clutch portion of the pulley mounted on the portion of the sleeve coaxially of the shaft to rotate with the sleeve and have axial movement on said portion of the sleeve, a collar on the portion of the sleeve coaxially of the shaft abutting the sleeve shoulder, springs interposed between said collar and second clutch member normally disengaging the clutch members, and means for applying axial pressure to the pulley and clutch member against the action of the springs to engage the clutch members.

13. In a clutch device, a drive shaft, a sleeve mounted on the shaft to rotate therewith and permit of axial movement of one relative to the other, a clutch member rotatable on the sleeve, a second clutch member adapted to co-operate with the first clutch member loosely mounted on the sleeve, means to cause said second clutch member to rotate with and permit it to have axial movement relative to the sleeve, a ball thrust bearing at the end of each clutch member, springs between and urging the clutch members to disengaging position, means engaging at the outer end of each thrust bearing to limit the disengaging movement of the clutch members, and means operative to actuate said latter means to exert axial pressure on the clutch members through said thrust bearings against the action of the springs without exerting axial pressure on the shaft to engage and retain the clutch members in engagement and to release said pressure applying means from the clutch members to permit disengagement of the clutch members by the springs.

14. In a clutch device, a shaft, a sleeve member slidably engaged on and rotatable with the shaft, a clutch member mounted on the sleeve member to revolve around and held against axial movement on the sleeve member, a second clutch member adapted to co-operate with said first clutch member mounted on the sleeve member to revolve therewith and have axial movement relative to the first clutch member, and means for causing a relative axial movement of said clutch members to cause them to engage and disengage without applying axial pressure to the shaft.

15. In a clutch device, a shaft, a sleeve member slidably engaged on and rotatable with the shaft, a combined pulley and clutch member mounted on the sleeve member to revolve around and held against axial movement on the sleeve member, a second clutch member mounted on the sleeve member adapted to co-operate with said first clutch member to transmit the rotation of the shaft to said pulley and clutch member, means for causing said second clutch member to revolve with said sleeve member and to permit it to move axially in relation thereto, means between the sleeve member and second clutch member normally urging said second clutch member out of engagement with the first clutch member, and means engaging at the ends of the clutch members operative to axially move said second clutch member to cause engagement and disengagement of said clutch members without applying axial pressure to the shaft.

OSCAR I. JUDELSHON.